US008230422B2

(12) United States Patent
Bohrer et al.

(10) Patent No.: US 8,230,422 B2
(45) Date of Patent: Jul. 24, 2012

(54) ASSIST THREAD FOR INJECTING CACHE MEMORY IN A MICROPROCESSOR

(75) Inventors: Patrick Joseph Bohrer, Austin, TX (US); Orran Yaakov Krieger, Newton, MA (US); Ramakrishnan Rajamony, Austin, TX (US); Michael Rosenfield, Ridgefield, CT (US); Hazim Shafi, Austin, TX (US); Balaram Sinharoy, Poughkeepsie, NY (US); Robert Brett Tremaine, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 2325 days.

(21) Appl. No.: 11/034,546

(22) Filed: Jan. 13, 2005

(65) Prior Publication Data
US 2006/0155963 A1 Jul. 13, 2006

(51) Int. Cl.
*G06F 9/46* (2006.01)
*G06F 9/40* (2006.01)
*G06F 13/28* (2006.01)
(52) U.S. Cl. ......... 718/101; 718/102; 712/215; 711/117
(58) Field of Classification Search ............... 718/1, 104
See application file for complete search history.

(56) References Cited

U.S. PATENT DOCUMENTS

| 6,134,710 | A | * | 10/2000 | Levine et al. | 717/158 |
|---|---|---|---|---|---|
| 6,282,615 | B1 | * | 8/2001 | Arimilli et al. | 711/122 |
| 6,931,514 | B2 | * | 8/2005 | Shibayama et al. | 712/216 |
| 2002/0188807 | A1 | * | 12/2002 | Chaudhry et al. | 711/128 |
| 2003/0004683 | A1 | * | 1/2003 | Nemawarkar | 702/186 |
| 2005/0071438 | A1 | * | 3/2005 | Liao et al. | 709/214 |
| 2005/0071841 | A1 | * | 3/2005 | Hoflehner et al. | 718/100 |

* cited by examiner

*Primary Examiner* — Camquy Truong
(74) *Attorney, Agent, or Firm* — Yudell Isidore Ng Russell PLLC

(57) ABSTRACT

A data processing system includes a microprocessor having access to multiple levels of cache memories. The microprocessor executes a main thread compiled from a source code object. The system includes a processor for executing an assist thread also derived from the source code object. The assist thread includes memory reference instructions of the main thread and only those arithmetic instructions required to resolve the memory reference instructions. A scheduler configured to schedule the assist thread in conjunction with the corresponding execution thread is configured to execute the assist thread ahead of the execution thread by a determinable threshold such as the number of main processor cycles or the number of code instructions. The assist thread may execute in the main processor or in a dedicated assist processor that makes direct memory accesses to one of the lower level cache memory elements.

25 Claims, 4 Drawing Sheets

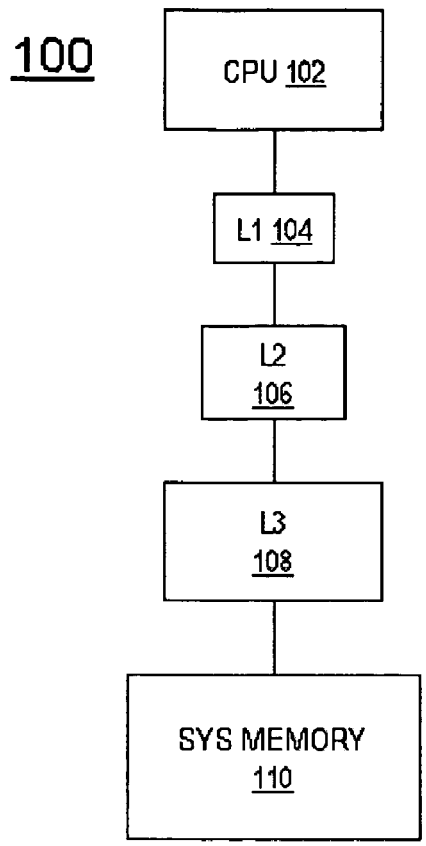
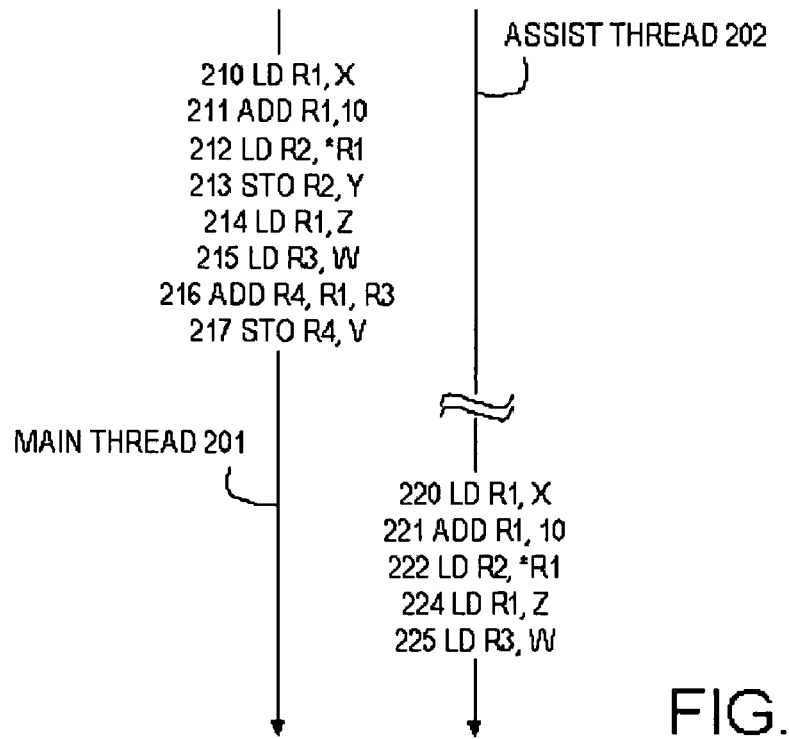
FIG. 1
(PRIOR ART)
FIG. 2

ASSIST THREAD FOR INJECTING CACHE MEMORY IN A MICROPROCESSOR

This invention was made with government support under NBCHCO20056 awarded by PERCS phase one. THE GOVERNMENT HAS CERTAIN RIGHTS IN THIS INVENTION.

BACKGROUND

1. Field of the Present Invention

The present invention is in the field of microprocessors and more particularly microprocessors employing multiple levels of cache memory to reduce memory access latency.

2. History of Related Art

Memory latency refers to the delay associated with retrieving data from memory in a microprocessor-based data processing system. The pace at which microprocessor cycle times have decreased has exceed improvements in memory access times. Accordingly, memory latency has remained as a barrier to improved performance and has increased in significance with each additional advance in microprocessor performance.

Numerous techniques, varying widely in both effectiveness and complexity, have been proposed and/or implemented to reduce performance bottlenecks attributable to memory latency. Perhaps the most significant and pervasive technique is the use of cache memory. A cache memory is a storage element that is relatively small and fast compared to system memory. The cache memory contains, at any time, a subset of the data stored in the system memory. When a general purpose microprocessor requires data, it attempts to retrieve the data from its cache memory. If the needed data is not currently present in the cache memory, the data is retrieved from system memory and the contents of the cache memory are updated at the same time that the data is provided to the microprocessor. In this manner, the cache memory is continuously being updated with the most recently accessed data.

The effectiveness of cache memory in addressing system memory latency is dependent upon a high percentage of memory accesses being fulfilled from the cache memory. Fortunately, studies have shown that most programs tend to exhibit spatial and temporal locality in their memory access patterns. Spatial locality implies that programs tend to access data that is nearby (in terms of memory address) data that was recently accessed. Temporal locality implies that programs tend to access data that was recently accessed. Both factors validate the use of cache memory subsystems to address memory latency.

Cache memory is so effective in reducing latency that cache memory subsystems have evolved rapidly in both size and architecture. Typical cache memory subsystems now include multiple levels of cache memory units that are tiered to provide a spectrum of size and speed combinations. Referring to FIG. 1, for example, selected elements of a conventional microprocessor-based data processing system 100 are depicted to illustrate the use of cache memory. In FIG. 1 system 100 includes a central processing unit 102 and three tiers of cache memory between the microprocessor 102 and system memory 110. A level one (L1) cache 104 is the smallest, fastest, and most expensive cache memory unit of the three. L1 cache 104 sits "next" to central processing unit (CPU) 102 and is the first cache memory accessed by CPU 102. If a CPU memory access can be satisfied from the contents of L1 cache 104, latency is minimized to perhaps two CPU cycles.

When a CPU memory access "misses" in L1 cache 104 (i.e., CPU 102 attempts to access data that is not present or valid in L1 cache 104) the memory request is passed to the larger and slower L2 cache 106 to determine if the requested data is valid therein. If the memory access "hits" in L2 cache 106, the data is retrieved to satisfy the CPU request and the L1 cache is updated with the requested data. If the memory access misses in L2 cache 106, the memory request is passed to the still larger and slower L3 cache 108. If the memory access hits in L3 cache 108, the data is retrieved and provided to CPU 102 and the contents of L2 cache 106 and L1 cache 104 are updated. Finally, if a memory access misses in L3 cache 108, the data is retrieved from system memory 110 and each cache memory 104, 106, and 108 is updated.

The latency associated with L1 cache 104 is usually capable of being "hidden" using techniques such as prefetching, multithreaded execution, out of order execution, speculative execution, and the like. These techniques, unfortunately, typically require sophisticated hardware that consumes valuable microprocessor real estate. Moreover, such techniques are not capable of hiding long latencies associated with lower level cache miss events. It would be desirable, therefore, to implement a system and method for reducing latency in multiple-tiered cache memory subsystems. It would be further desirable if the implemented solution did not require a significant amount of dedicated hardware and relied instead, on existing hardware and architectures to the greatest extent possible.

SUMMARY OF THE INVENTION

The identified objectives are addressed in the present invention by a data processing system that includes a main processor having conventional access to multiple levels of cache memories. The main processor executes a main thread compiled from a source code object. The system may also include a dedicated assist processor for executing an assist thread also derived from the source code object. The assist thread includes memory reference instructions of the main thread and only those arithmetic instructions required to resolve the memory reference instructions. A scheduler configured to schedule the assist thread in conjunction with the corresponding execution thread is configured to execute the assist thread ahead of the execution thread by a determinable threshold such as a specific number of program instructions (wherein the assist thread is constrained to execute no more than a specified number of instructions ahead of the main thread), or a specific number of memory access operations (wherein the assist thread is constrained to have no more than a specified number of outstanding memory access misses). The assist thread may execute in the main processor or in the assist processor. The assist processor, if used, is preferably designed to be architecturally adjacent to one of the lower level caches so that the assist processor can make direct accesses to one of the lower level caches.

BRIEF DESCRIPTION OF THE DRAWINGS

Other objects and advantages of the invention will become apparent upon reading the following detailed description and upon reference to the accompanying drawings in which:

FIG. 1 is a block diagram of selected elements of a memory subsystem for a general purpose microprocessor according to the prior art;

FIG. 2 is a conceptual illustration of a main thread and an assist thread according to an embodiment of the present invention;

Figure 3:
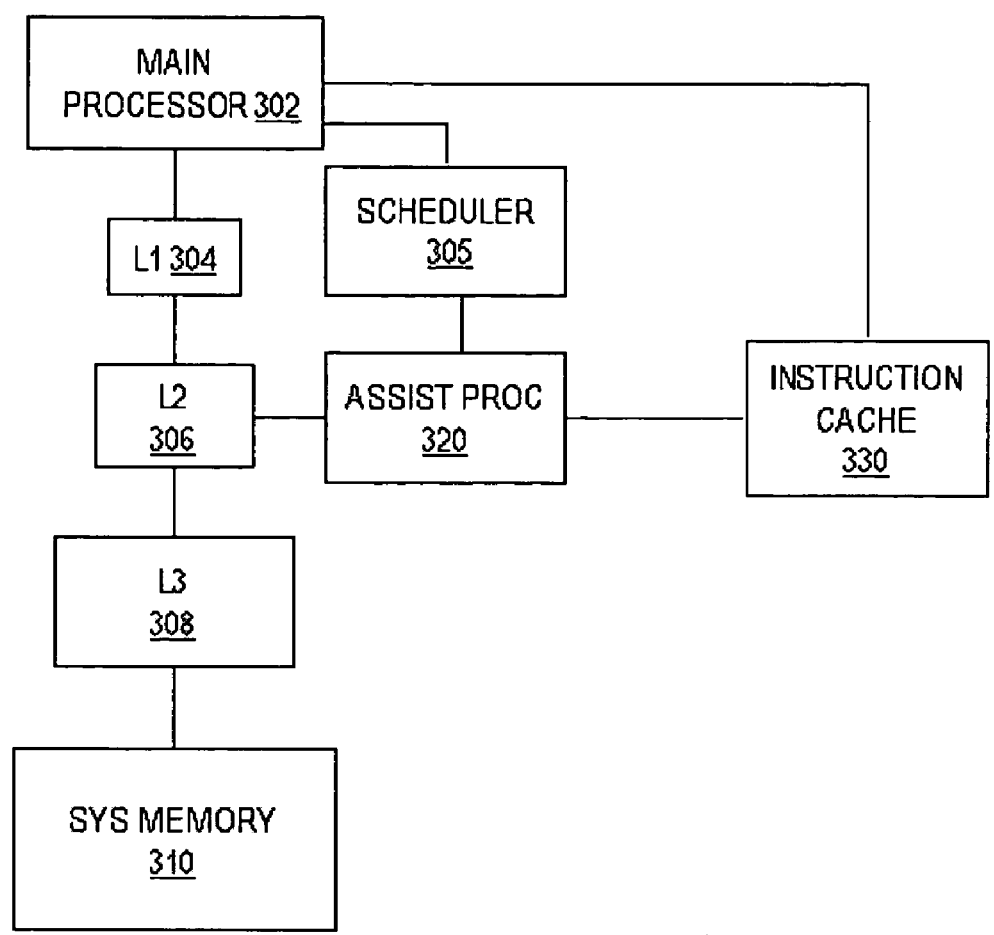
FIG. 3 is a block diagram of selected elements of a microprocessor-based data processing system according to an embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the invention is concerned with reducing memory access latency in a microprocessor-based computing device or data processing system without substantially adding to the hardware elements that are already present. When a piece of source code is compiled to create an executable "thread" referred to herein as the main thread, a secondary executable file, referred to herein as the assist thread or simply the assist thread is also created. In another implementation, the assist thread is created as a section of the main thread so that it does not have to be a separate file. The assist thread is designed to execute ahead of the main thread for the sole purpose of making memory access references that the main thread will be making when it executes shortly thereafter. When the assist thread makes a memory access reference, the cache subsystem responds by determining whether the referenced memory address is valid in the cache and, if not, by retrieving data from the referenced system memory address. When the main thread subsequently accesses the same memory address, a cache miss is much less likely. By leveraging the cache subsystem's native ability to update itself in response to a cache miss, the use of an assist thread reduces cache misses without requiring any significant additional or dedicated hardware.

Referring now to FIG. 2, a conceptual illustration of a main thread 201 and a corresponding assist thread 202 according to one implementation is presented to emphasize significant aspects of assist thread 202. Generally, assist thread 202 is a streamlined version of main thread 201 designed to make all of the same memory references that main thread 201 will make. More specifically, assist thread 202 as shown in FIG. 2 includes only the following instructions from main thread 201: the memory access instructions (or at least all of the load instructions) of main thread 201, those arithmetic instructions required to resolve the references in a memory access instruction, and the control flow (branch) instructions required to determine whether a memory access instruction must be executed. All other arithmetic, floating point, and other instructions from main thread 201 are eliminated from assist thread 202 to minimize its size and complexity. By scheduling the assist thread in conjunction with the main thread and constraining the two threads such that the assist thread executes "ahead" of the main thread, the number of cache miss events encountered by the main thread as it executes is improved significantly.

As depicted in FIG. 2, for example, main thread 201 includes six memory access instructions and two arithmetic instructions. The memory access instructions include load instructions 210, 212, 214, and 215, store instructions 213 and 217 and arithmetic instructions 211 and 216. Load instructions 210, 214, and 215 are direct memory references that can be resolved from the load instruction itself. Load instruction 212, on the other hand, is an indirect memory reference that cannot be resolved without determining the value stored in R1, which is dependent on the arithmetic add instruction 211.

The assist thread 202 that corresponds to main thread 201 includes load instructions 220, 222, 224, and 225 corresponding to the main thread load instructions 210, 212, 214, and 215 respectively and an arithmetic add instruction 221 corresponding to main thread add instruction 211. Thus, whereas main thread 201 includes a total of eight instructions, assist thread 202 includes only five instructions. The add instruction 221 is included in assist thread 202 because it is needed to resolve the memory reference made in load instruction 222. The assist thread 202 does not include an add instruction corresponding to main thread add instruction 216 because there is no subsequent load instruction that depends on the outcome of add instruction 216.

The depicted implementation of assist thread 202 does not include instructions corresponding to the store instructions 213 and 217 of main thread 201. The store instructions of main thread 201 are omitted from assist thread 202 because, as a general rule, latency is a less significant issue for store instructions than it is for load instructions. Unlike load instructions, store results can be buffered and handled (written back to memory) without substantially impacting main processor performance. In other implementations, however, assist thread 202 may include all memory reference instructions including instructions that will prefetch the memory locations corresponding to the store instructions in the execution thread. Such an implementation might be suitable, for example, with respect to an application that produces more store instructions than the cache subsystem is capable of buffering.

Figure 5:
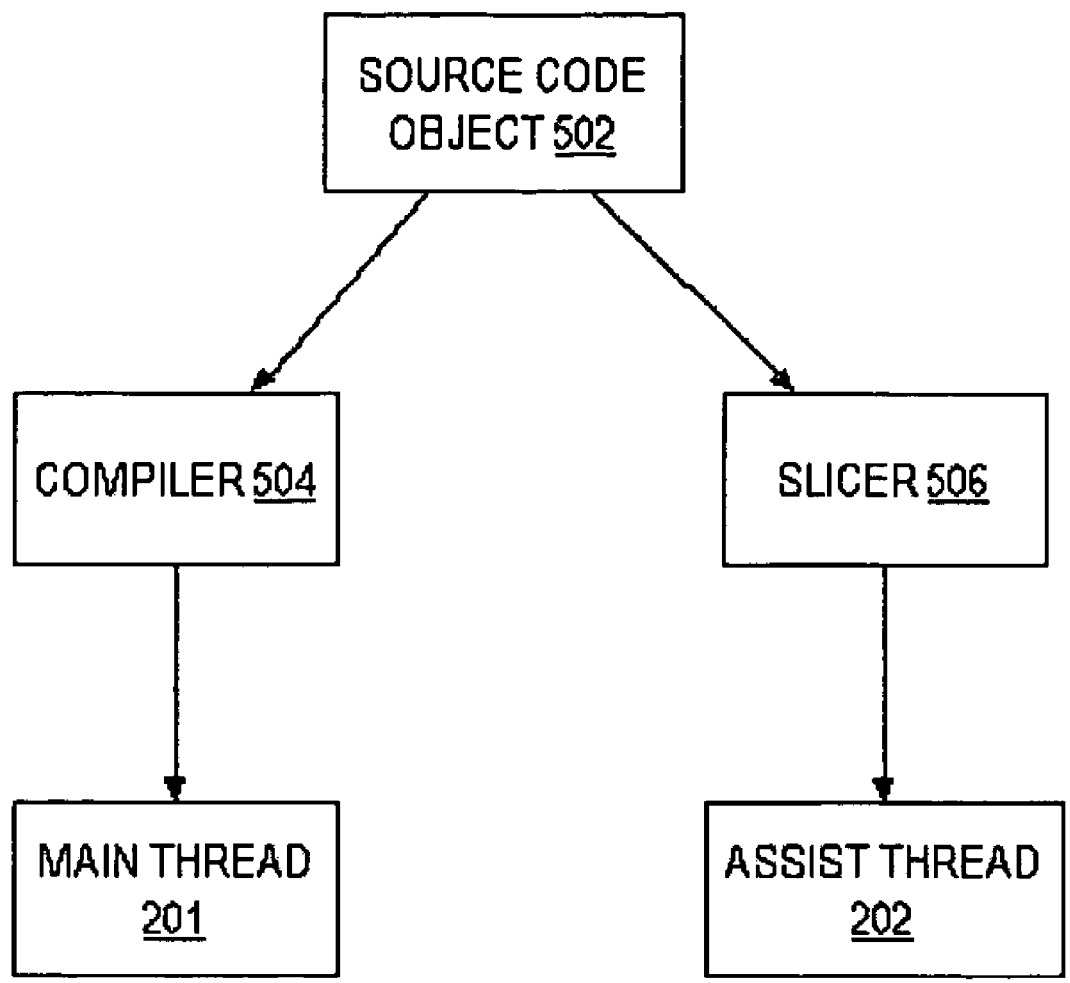
FIG. 5 is a diagram illustrating the creation of a main thread and an associated assist thread according to the present invention.

Referring to FIG. 5 momentarily, assist thread 202 is created from the same source code object 502 that is used to create main thread 201. A conventional compiler 504 receives source code object 502 as its input and, in response, creates main thread 201 using compiling techniques that are known in the field. In addition, however, source code object 502 is also provided to a program slicer 506 that creates an assist thread 202 suitable for execution in conjunction with main thread 201.

Program slicer 506 may include elements of developmental and commercially distributed object code slicers such as the Wisconsin Program Slicing Tool described at www.cs.wisc.edu/wpis/slicing_tool/ and the CodeSurfer tool distributed by GrammaTech, Inc. Such object code slicers enable one to find meaningful decompositions of programs, where the decompositions consist of elements that are not textually contiguous. A program slice with respect to a set of program elements S is a projection of the program that includes only program elements that might affect (either directly or indirectly) the values of the variables used at members of S. In the context of the present invention, program slicer 506 is used to extract memory reference instructions and arithmetic instructions upon which the memory reference instructions depend.

Referring now to FIG. 3, a block diagram of selected elements of a data processing system 300 according to one embodiment of the present invention is depicted. In the depicted embodiment, system 300 includes a main processor 302, an L1 cache 304, an L2 cache 306, and an L3 cache 308. In addition, system 300 includes a dedicated, special purpose processor referred to in herein as assist processor 320. Assist processor 320, in the depicted embodiment, is directly connected or architecturally adjacent to a lower level cache memory unit, namely, L2 cache 306. A scheduler 305 is connected to main processor 302 and to assist processor 320. An instruction cache 330 provides instructions to main processor 302 and assist processor 320.

Main processor 302 may be composed of multiple individual processing devices and each individual processing device may have multiple processing cores. Assist processor 320 may be integrated into the same chip as main processor 302. In embodiments emphasizing the ability of assist processor 320 to access lower cache levels directly, however, assist processor 320 is preferably implemented at the same chip as that of a lower level cache. Assist processor 320 preferably includes a limited set of the elements found in main processor 302, such as a load/store unit and an arithmetic logic unit, but preferably omits other elements, such as a floating point unit, to conserve spatial and power requirements. Scheduler 305 might be included on the same chip as main processor 302 or implemented alongside the assist processor 320. Scheduler 305 may also be a software construct, whose functions are executed by the main execution thread and the assist thread.

Scheduler 305 is configured to control execution of main thread 201 in conjunction with assist thread 202. Specifically, scheduler 305 is configured to schedule assist thread 202 to execute ahead of main thread 201 by a predetermined interval. The interval may be measured in terms of (approximated) main processor cycles or in terms of code instructions. Ideally, scheduler 305 maintains execution of assist thread 202 sufficiently ahead of main thread 201 such that the cache subsystem response to a cache miss experienced by assist thread 202 produces a cache hit in main thread 201 when the main thread executes a memory access to the same memory address. On the other hand, it is desirable to maintain execution of the two threads sufficiently close to each other to prevent intervening programs from invalidating data that was referenced by assist thread 202. Thus, there may be an optimum delay between assist thread 202 and main thread 201 and scheduler 305 that minimizes cache miss events experienced by main thread 201.

In one embodiment, scheduler 305 is implemented entirely in software with the main execution thread periodically executing "marker" instructions that serve to inform the assist thread where it is in the execution stream. These "marker" instructions could be implemented as stores to a special address that the assist thread polls. By synchronizing with the main thread in this manner, the assist thread can be constrained to be ahead of the main thread within a specified instruction execution interval. By providing a limited form of hardware support, the "marker" instructions can also be implemented as writes to a special register that the assist thread polls. In another embodiment, scheduler 305 is implemented purely in the assist thread by forcing it to have a limit on the number of outstanding memory access misses. In a third embodiment, the main execution thread increments a counter each time it has a cache miss. The assist thread also increments a counter each time it encounters a cache miss. The assist thread issues memory accesses only as long as the difference between the two counters is within a specified limit.

As described above, assist thread 202 generates the same memory access references that main 201 will make when it executes. When the assist thread 202 memory references are made by assist processor 320, the cache subsystem (the aggregation of L1 cache 304, L2 cache 306, L2 cache 308, and the corresponding control logic) will cause the requested data to be injected into the cache subsystem. When main thread 201 executes a memory access instruction, presumably shortly after assist thread 202 executes the corresponding instruction, the memory access made by main thread 201 is unlikely to result in a cache miss. Even if it does result in a cache miss, the main thread's access is not likely to suffer the full cache miss penalty because the assist thread has already issued the memory access.

The embodiment depicted in FIG. 3 emphasizes a loose coupling between main thread 201 (FIG. 2), which executes on main processor 302 and assist thread 202, which executes on assist processor 320. The depicted embodiment is referred to as loose coupling between assist thread 202 and main thread 201 because assist thread 202 executes on assist processor 320 and main thread 201 executes on main processor 302. Loose coupling between the two threads beneficially enables main processor 302 additional processing capacity and thus represents a better use of resources at the cost of added complexity in controlling the scheduling of the two threads.

In contrast, another embodiment of the invention uses an assist thread that is tightly coupled to its corresponding main thread. In one such embodiment, for example, main processor 302 supports simultaneous multithreaded (SMT) execution. In this embodiment, main processor 302 includes two (or possibly more) SMT "slots" or virtual processors that can execute essentially simultaneously but have their own independent context. SMT processors recognize that, even in the absence of long delays caused by cache misses and other events, processor resources tend to be underutilized meaning that, at any given time, there are stages within the execution units (load/store units, arithmetic units, etc.) that are vacant. The POWER5™ processor from IBM Corporation is an example of a general purpose processor that supports SMT.

In the tightly coupled embodiment, main thread 201 and assist thread 202 execute on a common physical processor, such as main processor 302. In perhaps the most tightly coupled implementation, main thread 201 and assist thread 202 execute on an SMT microprocessor where each thread is allocated an SMT slot of the processor. The tightly coupled embodiment beneficially simplifies the logic and/or code needed to control the delay between the two threads at the cost of consuming some of the general purpose processing capability of main processor 302 for a program (i.e., assist thread 202) that consists largely of "dead code" (code that does not alter the contents of memory).

Returning momentarily to the loosely coupled implementation depicted in FIG. 3, an advantage of the depicted implementation is the placement of assist processor 320 where it is architecturally adjacent to the lower level cache memory elements. Specifically, assist processor 320 as depicted in FIG. 3 is configured to issue memory access references directly to L2 cache 306. This architecture is beneficial because it prevents assist processor 320 from making a large number of L1 accesses. It is desirable to keep the L1 cache 304 available for the main threads. By requiring the L1 cache to be write-through (as is the case with most processors such as the IBM Power4 and Power5), this configuration also permits the assist thread to become aware of writes to memory from the main thread. More specifically, when the assist processor 320 is architecturally adjacent to a lower level cache, it is placed at the coherence point for the system.

Assist processor 320 and the cache subsystem may also be configured where cache references to the L2 cache 306 made by assist processor 320 "trickle up" to L1 cache 304. In other words, a reference made directly to L2 cache memory 306 by assist processor 320 updates the contents of L1 cache 304. This technique is an extension of existing techniques in which memory access references are always issued to the L1 cache initially and, when misses occur, the data is taken from the L2 cache if it is present and valid, the L3 cache if the data is not valid in the L2 cache, and so forth.

Portions of the invention may be implemented as a set or sequence of computer executable instructions (i.e., computer software code) stored on a computer readable medium such as a hard disk, floppy diskette, CD, magnetic tape and the like. During execution of the computer code, portions of the code may reside in a volatile storage element such as a system memory or a cache memory.

Figure 4:
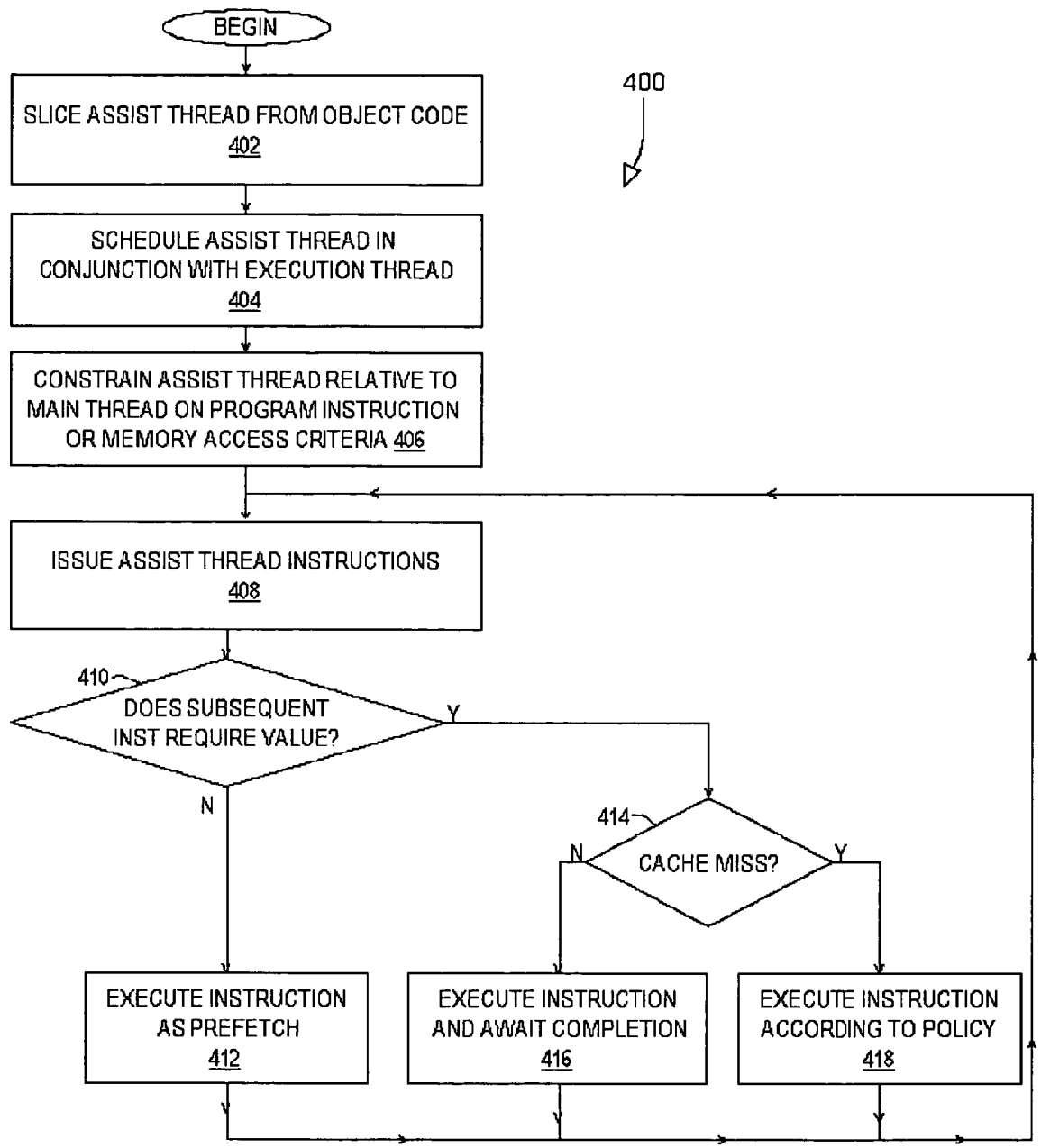
FIG. 4 is a flow diagram of a method and software code for reducing memory latency according to an embodiment of the present invention.

Referring now to FIG. 4 a flow diagram illustrates selected elements or steps of a method 400 for reducing cache miss events in a data processing system according to one embodiment of the present invention is depicted. Method 400 is also a conceptual depiction of computer code that, when executed, performs the depicted elements or steps.

In the depicted embodiment, the method is initiated by deriving or "slicing" (block 402) an assist thread from a source code object. The source code object from which the assist thread is sliced is also the source code object that is compiled to generate a main thread with which the assist thread is associated. The assist thread is subsequently scheduled for execution (block 404) in conjunction with the execution of the main thread. As described above, the assist thread may be scheduled for execution on the assist processor or on the main processor itself. The scheduler is configured to constrain (block 406) the execution of the assist thread relative to the main thread so that the assist thread remains ahead of the main thread. The delay between the two threads may be based on a specific number of program instructions (wherein the assist thread is constrained to execute no more than a specified number of instructions ahead of the main thread), or may be based on a specific number of memory access operations (wherein the assist thread is constrained to have no more than a specified number of outstanding memory access misses).

The remaining elements of method 400 depicted in FIG. 4 refer to assist thread instructions and the processor on which the assist thread is executing (whether that processor is the main processor or the assist processor). For purposes of describing FIG. 4, the assist thread instructions are presumed to be executing on the assist processor. After scheduling and properly constraining the relative execution of the main thread and the assist thread, an assist thread instruction is issued (block 408) for execution.

Initially, the assist processor determines (block 410) whether the issued instruction provides a value that is required by a subsequent instruction. If no subsequent assist thread instruction relies or depends on a value generated or retrieved by the issued assist thread instruction (block 412), the issued assist thread instruction is treated as a prefetch instruction wherein the assist processor does not await completion of the issued assist thread instruction before proceeding to issue a subsequent assist thread instruction. If, however, the issued assist thread instruction does retrieve, or generate a value that is needed by a subsequent assist thread instruction, the assist thread determines (block 414) whether the issued assist thread instruction misses in the cache subsystem.

As described earlier the assist processor may be architecturally adjacent to the L2 cache (or to the cache level at which coherence is maintained in the system). In such cases, the assist processor may access the cache to which it is adjacent so that, for example, instead of initially determining whether a memory reference hits in the L1 cache, the assist processor may access the L2 (or lower) cache and make a hit/miss determination based on the contents of the lower level cache. Regardless of the specific cache level that the assist processor accesses directly, if the assist processor determines in block 414 that a memory reference produces a cache hit, the assist processor according to the depicted embodiment of method 400 executes (block 416) the issued instruction and awaits completion of the instruction before proceeding.

If, however, the issued assist thread instruction includes a memory reference that misses in the cache memory, the depicted embodiment of method 400 includes executing (block 418) the instruction based on a predetermined policy. The policy preferably indicates which of a set of assist thread instruction execution strategies is pursued when an assist thread instruction having dependent assist thread instructions misses in the cache. The alternatives might include, for example, (1) issuing the assist thread instruction and waiting for the result before proceeding with the assist thread, (2) predicting the result of the assist thread instruction (i.e., predicting the value of the data that would be retrieved) and resuming execution without subsequently checking the accuracy of the prediction, and (3) predicting the result of the assist thread instruction, resuming execution, and subsequently verifying the prediction and taking corrective action if the prediction was incorrect. In the case of a policy involving prediction of the data to be retrieved, any of a variety of prediction mechanisms may be suitably employed. An example of a data prediction algorithm, desirable for its simplicity, is the "predict 0" algorithm in which the value of any particular piece of data is predicted to be 0 based on evidence suggesting that a large percentage of retrieved data has a value of 0. Another example for predicting the contents of a particular memory location is the "use last" prediction mechanism in which a stale (no longer valid) value in a cache memory is used as the predicted value for the corresponding memory address.

It will be apparent to those skilled in the art having the benefit of this disclosure that the present invention contemplates a system and method for improving performance and reducing cache miss penalties in a data processing system. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A computer program product comprising:
   a non-transitory computer readable storage medium that stores program code for reducing latency in a data processing system having a multi-level cache hierarchy including a higher level cache having a lower access latency and a lower level cache having a higher access latency, wherein the program code causes the data processing to perform:
   generating a main thread and an assist thread from a source code object, wherein the assist thread includes a smaller subset of the instructions in the main thread;
   scheduling the assist thread to execute in conjunction with the main thread;
   constraining execution of the main thread relative to the assist thread, such that each instruction in the main thread having a corresponding instruction in the assist thread executes after the corresponding instruction in the assist thread;

making a memory access requested by an instruction of the assist thread directly to the lower level cache without first accessing the higher level cache and making a corresponding memory access requested by an instruction in the main thread to the higher level cache; and responsive to a memory access indicated by a selected memory reference instruction in the assist thread missing in the lower level cache, determining whether a subsequent assist thread instruction depends on the selected memory reference instruction and, if so, taking action based on an assist thread policy, wherein the assist thread policy is selected from a set of policies consisting of awaiting completion of the selected memory reference instruction, predicting an outcome of the selected memory reference instruction, and predicting the outcome of the selected memory reference instruction and verifying the outcome upon completion.

2. The computer program product of claim 1, said generating comprising compiling the source code object to create the main thread and compiling selected instructions of the source code object to derive the assist thread.

3. The computer program product of claim 1, wherein the constraining comprises constraining the main thread to execute a predetermined number of main processor cycles behind the assist thread.

4. The computer program product of claim 1, wherein the constraining comprises constraining the main thread to execute a predetermined number of code instructions behind the assist thread.

5. The computer program product of claim 1, wherein the scheduling comprises scheduling the assist thread to execute in a first simultaneous multithreading (SMT) slot of a main processor of the data processing system and scheduling the main thread to execute in a second SMT slot of the main processor.

6. The computer program product of claim 1, wherein the scheduling comprises scheduling the assist thread to execute on an assist processor of the data processing system and scheduling the main thread to execute on a physically distinct main processor of the data processing system.

7. The computer program product of claim 1, wherein the subset of instructions includes:
memory access instructions, those arithmetic instructions required to resolve memory references in the memory access instructions, and any branch instruction required to determine whether a memory access instruction among the memory access instructions is to be executed.

8. The computer program product of claim 1, wherein the program code causes the data processing system to execute the assist thread executes such that the assist thread has no more than a specified number of outstanding memory access misses.

9. A method for reducing memory latency associated with a main thread in a data processing system including a higher level cache having a lower access latency and a lower level cache having a higher access latency, the method comprising:
generating a main thread and an assist thread from a source code object, wherein the assist thread includes a smaller subset of the instructions in the main thread;
scheduling the assist thread to execute in conjunction with the main thread;
constraining execution of the main thread relative to the assist thread, such that each instruction in the main thread having a corresponding instruction in the assist thread executes after the corresponding instruction in the assist thread;
making a memory access requested by an instruction of the assist thread directly to the lower level cache without first accessing the higher level cache and making a corresponding memory access requested by an instruction in the main thread to the higher level cache; and
responsive to a selected memory reference instruction in the assist thread missing in the lower level cache memory of the system, determining whether a subsequent assist thread instruction depends on the selected memory reference instruction and, if so, taking action based on an assist thread policy, wherein the assist thread policy is selected from a set of policies consisting of awaiting completion of the selected memory reference instruction, predicting an outcome of the selected memory reference instruction, and predicting the outcome of the selected memory reference instruction and verifying the outcome upon completion.

10. The method of claim 9, wherein said generating comprises compiling a source code object to create the main thread and compiling selected instructions of the source code object to derive the assist thread.

11. The method of claim 9, wherein constraining execution of the main thread relative to the assist thread comprises constraining the main thread to execute a predetermined number of main processor cycles behind the assist thread.

12. The method of claim 9, wherein constraining execution of the main thread relative to the assist thread comprises constraining the main thread to execute a predetermined number of code instructions behind the assist thread.

13. The method of claim 9, wherein the scheduling comprises scheduling the assist thread to execute in a first simultaneous multithreading (SMT) slot of a main processor of the data processing system and scheduling the main thread to execute in a second SMT slot of the main processor.

14. The method of claim 9, wherein the scheduling comprises scheduling the assist thread to execute on a dedicated assist processor and scheduling the main thread to execute on a physically distinct main processor of the data processing system.

15. The method of claim 9, wherein the subset of instructions includes:
memory access instructions, those arithmetic instructions required to resolve memory references in the memory access instructions, and any branch instruction required to determine whether a memory access instruction among the memory access instructions is to be executed.

16. The method of claim 9, and further comprising executing the assist thread such that the assist thread has no more than a specified number of outstanding memory access misses.

17. A data processing system, comprising:
a multi-level cache memory hierarchy including at least a higher level cache having a lower access latency and a lower level cache having a higher access latency;
a main processor coupled to access the multi-level cache memory, wherein the main processor simultaneously executes a main thread and an assist thread, wherein the assist thread is derived from a same source code object as the main thread and contains a smaller subset of the instructions in the main thread, and wherein the main processor makes memory accesses indicated by the main thread to the higher level cache and makes memory accesses indicated by the assist thread directly to the lower level cache without first accessing the higher level cache, wherein responsive to a selected memory reference instruction in the assist thread missing in the lower level cache memory of the system, the main processor determines whether a subsequent assist thread instruction depends on the selected memory reference instruction and, if so, takes action based on an assist thread policy, wherein the assist thread policy is selected from a set of policies consisting of awaiting completion of the selected memo reference instruction, predicting an outcome of the selected memory reference instruction, and predicting the outcome of the selected memory reference instruction and verifying the outcome upon completion; and a scheduler that schedules execution of the assist thread and the main thread for simultaneous execution, wherein execution of the main thread is constrained such that each instruction in the main thread having a corresponding instruction in the assist thread executes after the corresponding instruction in the assist thread.

18. The system of claim 17, wherein the scheduler schedules the assist thread to execute no more than a specified number of instructions ahead of the main thread.

19. The system of claim 17, wherein the main processor executes such that the assist thread has no more than a specified number of outstanding memory access misses.

20. The system of claim 17, wherein:

the main processor supports at least a first simultaneous multithreading (SMT) slot in which the main thread executes and a second SMT slot in which the main thread executes.

21. The system of claim 17, wherein the subset of instructions includes:

memory access instructions, those arithmetic instructions required to resolve memory references in the memory access instructions, and any branch instruction required to determine whether a memory access instruction among the memory access instructions is to be executed.

22. A data processing system, comprising:

a multi-level cache memory hierarchy including at least a higher level cache having a lower access latency and a lower level cache having a higher access latency;

a main processor coupled to the multi-level memory hierarchy, wherein the main processor executes a main thread and makes memory accesses requested by instructions in the main thread to the higher level cache;

an assist processor physical distinct from the main processor, wherein the assist processor executes an assist thread derived from a same source code object as the main thread and contains a smaller subset of the instructions in the main thread, and wherein the assist processor makes memory accesses requested by instructions in the assist thread directly to the lower level cache without first accessing the higher level cache, wherein responsive to a selected memory reference instruction in the assist thread missing in the lower level cache memory of the system, the assist processor determines whether a subsequent assist thread instruction depends on the selected memory reference instruction and, if so, takes action based on an assist thread policy, wherein the assist thread policy is selected from a set of policies consisting of awaiting completion of the selected memory reference instruction, predicting an outcome of the selected memory reference instruction, and predicting the outcome of the selected memory reference instruction and verifying the outcome upon completion; and a scheduler that schedules execution of the assist thread and the main thread for simultaneous execution, wherein execution of the main thread is constrained such that each instruction in the main thread having a corresponding instruction in the assist thread executes after the corresponding instruction in the assist thread.

23. The system of claim 22, wherein the scheduler schedules the assist thread to execute no more than a specified number of instructions ahead of the main thread.

24. The system of claim 22, wherein the assist processor executes such that the assist thread has no more than a specified number of outstanding memory access misses.

25. The system of claim 22, wherein the subset of instructions includes:

memory access instructions, those arithmetic instructions required to resolve memory references in the memory access instructions, and any branch instruction required to determine whether a memory access instruction among the memory access instructions is to be executed.

* * * * *